(12) United States Patent
Bima

(10) Patent No.: US 10,243,941 B2
(45) Date of Patent: Mar. 26, 2019

(54) NEED BASED CONTROLLER AREA NETWORK BUS AUTHENTICATION

(71) Applicant: Denso International America, Inc., Southfield, MI (US)

(72) Inventor: Michael Bima, Milford, MI (US)

(73) Assignee: DENSO International America, Inc., Southfield, MI (US)

( * ) Notice: Subject to any disclaimer, the term of this patent is extended or adjusted under 35 U.S.C. 154(b) by 164 days.

(21) Appl. No.: 15/340,323

(22) Filed: Nov. 1, 2016

(65) Prior Publication Data

US 2018/0124030 A1 May 3, 2018

(51) Int. Cl.
*H04L 29/06* (2006.01)
*H04L 29/08* (2006.01)
(Continued)

(52) U.S. Cl.
CPC ........ *H04L 63/08* (2013.01); *H04L 12/40006* (2013.01); *H04L 63/1416* (2013.01);
(Continued)

(58) Field of Classification Search
None
See application file for complete search history.

(56) References Cited

U.S. PATENT DOCUMENTS

2002/0196935 A1* 12/2002 Wenocur .............. G06Q 10/107
380/37
2012/0190386 A1* 7/2012 Anderson ............. G01C 15/04
455/456.3

(Continued)

FOREIGN PATENT DOCUMENTS

WO    WO-2011000250 A1    1/2011

OTHER PUBLICATIONS

Taylor, Adrian et al. Anomaly Detection in Automobile Control Network Data with Long Short-Term Memory Networks. 2016 IEEE International Conference on Data Science and Advanced Analytics (DSAA). https://ieeexplore.ieee.org/stamp/stamp.jsp?tp=&arnumber=7796898 (Year: 2016).*

(Continued)

*Primary Examiner* — Jeremiah L Avery
(74) *Attorney, Agent, or Firm* — Harness, Dickey & Pierce, P.L.C.

(57) ABSTRACT

Systems and methods are provided and include a control module that receives a communication packet from a communication node that includes at least one of a vehicle sensor and a vehicle system via a controller area network bus. The control module determines whether the communication packet from the communication node indicates that the vehicle sensor or the vehicle system associated with the communication node is operating outside of a predetermined acceptable operating range. The control module sends an authentication message to the communication node in response to the communication packet indicating that the vehicle sensor or vehicle system is operating outside of the predetermined acceptable operating range. The control module determines whether a valid authentication code is received from the communication node and performs a remedial action for the communication node in response to the valid authentication code not being received from the communication node.

20 Claims, 3 Drawing Sheets

(51) Int. Cl.
*H04L 12/40* (2006.01)
*H04W 12/06* (2009.01)
(52) U.S. Cl.
CPC ............ *H04L 67/12* (2013.01); *H04W 12/06* (2013.01); *H04L 2012/40215* (2013.01)

(56) References Cited

U.S. PATENT DOCUMENTS

| | | | |
|---|---|---|---|
| 2013/0145482 A1* | 6/2013 | Ricci | H04W 4/90 726/28 |
| 2013/0203400 A1* | 8/2013 | Ricci | H04W 4/046 455/418 |
| 2013/0227648 A1* | 8/2013 | Ricci | G06F 3/0484 726/3 |
| 2013/0282238 A1* | 10/2013 | Ricci | G06F 3/0484 701/41 |
| 2014/0240088 A1* | 8/2014 | Robinette | G08B 13/1427 340/5.61 |
| 2015/0020152 A1 | 1/2015 | Litichever et al. | |
| 2015/0172306 A1 | 6/2015 | Kim et al. | |
| 2015/0191135 A1 | 7/2015 | Ben Noon et al. | |
| 2015/0271201 A1 | 9/2015 | Ruvio et al. | |
| 2016/0381068 A1* | 12/2016 | Galula | H04L 63/123 726/23 |
| 2017/0013005 A1* | 1/2017 | Galula | H04L 63/1425 |

OTHER PUBLICATIONS

Sharma, Abhishek et al. ScoutNode: A Multimodal Sensor Node for Wide Area Sensor Networks. 2009 Proceedings of 18th International Conference on Computer Communications and Networks. https://ieeexplore.ieee.org/stamp/stamp.jsp?tp=&arnumber=5235300 (Year: 2009).*

Sriborrirux, Wiroon et al. The Design of RFID Sensor Network for Bus Fleet Monitoring. 2008 8th International Conference on ITS Telecommunications. https://ieeexplore.ieee.org/stamp/stamp.jsp?tp=&arnumber=4740237 (Year: 2008).*

* cited by examiner

NEED BASED CONTROLLER AREA NETWORK BUS AUTHENTICATION

FIELD

The present disclosure relates to vehicle communication systems and, more particularly, to systems and methods of need based authentication of communication packets within a controller area network bus communication system of a vehicle.

BACKGROUND

As the number of sensors that transmit information wirelessly to a control module of a vehicle increases, the need for security from potential malicious attacks increases. A hacker could gain access to the systems and control module of the vehicle by attacking an individual sensor or system of the vehicle. However, authenticating every communication between the sensors and systems of the vehicle can exhaust the capacity of each communication and increase latency.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

The present teachings include a system comprising a control module configured to receive a communication packet from a communication node that includes at least one of a vehicle sensor and a vehicle system via a controller area network bus. The control module is also configured to determine whether the communication packet from the communication node indicates that the at least one of the vehicle sensor and the vehicle system associated with the communication node is operating outside of a predetermined acceptable operating range. The control module is also configured to send an authentication message to the communication node in response to the communication packet indicating that the at least one of the vehicle sensor and the vehicle system is operating outside of the predetermined acceptable operating range. The control module is also configured to determine whether a valid authentication code is received from the communication node in response to the authentication message. The control module is also configured to perform a remedial action for the communication node in response to the valid authentication code not being received from the communication node.

The present teachings also include a method comprising receiving, with a control module, a communication packet from a communication node that includes at least one of a vehicle sensor and a vehicle system via a controller area network bus. The method also includes determining, with the control module, whether the communication packet from the communication node indicates that the at least one of the vehicle sensor and the vehicle system associated with the communication node is operating outside of a predetermined acceptable operating range. The method also includes sending, with the control module, an authentication message to the communication node via the controller area network bus in response to the communication packet indicating that the at least one of the vehicle sensor and the vehicle system is operating outside of the predetermined acceptable operating range. The method also includes determining, with the control module, whether a valid authentication code is received from the communication node in response to the authentication message. The method also includes performing, with the control module, a remedial action for the communication node in response to the valid authentication code not being received from the communication node.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

A vehicle includes a number of sensors, systems, communication channels, and modules that transmit and exchange information, for example, via a controller area network (CAN) bus communication system. These transmissions may occur in the form of packets communicated over wired or wireless communication connections. To prevent increases in latency but still require authentication of the sensors, systems, and communication channels of the vehicle, the present disclosure implements need based CAN Bus authentication, which targets methods hackers may use to gain access and control of the vehicle. As such, the present disclosure determines when a threat may be present and authenticates packets accordingly.

In particular, one method hackers may use to gain access and control of the vehicle is to bombard one of the sensors of the vehicle with out-of-range values for that sensor. This can overload the vehicle systems or sensors and allow a hacker or intruder to gain access to the CAN bus communication system and to potentially control or provide commands to the various vehicle systems connected to the CAN bus. To detect this type of attack, systems and methods of the present disclosure require authentication of the sensor when the sensor is sending values outside of a predetermined acceptable operating range.

Figure 1:
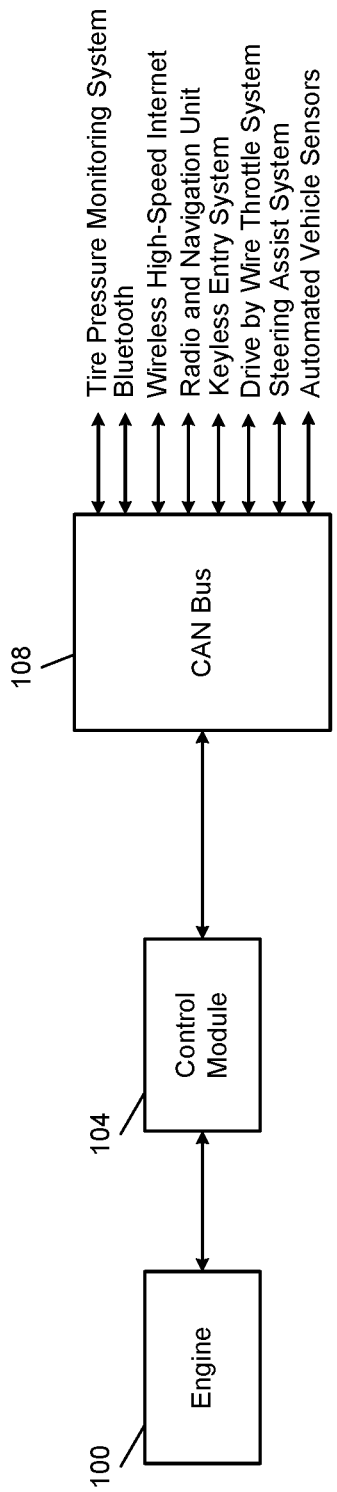
FIG. 1 is a functional block diagram of a controller area network (CAN) bus communication system in a vehicle.

With reference to FIG. 1, a functional block diagram of a CAN bus communication system in a vehicle is illustrated. The engine 100 is controlled by a control module 104. The control module 104 communicates with various sensors, systems, and communication channels of the vehicle via a controller area network (CAN) bus 108. For example, through the CAN Bus 108, the control module 104 can communicate with a tire pressure monitoring system, a Bluetooth system, a wireless high-speed internet connection, a radio and navigation unit, a keyless entry system, a drive by wire throttle system, a steering assist system, automatic vehicle sensors, other vehicle and/or communication systems, etc. These sensors and systems may communicate with the control module 104 or with other vehicle control modules or systems, through the CAN Bus 108 using wired or wireless connections. Each individual sensor and system is a communication node communicating over the CAN Bus 108. Each communication node can communicate information about the respective sensor or system to the control module 104. Communication packets are sent to sensors and systems from the CAN bus. In addition, communication packets are also sent from the sensors and systems to the CAN bus. In other words, the communication over the CAN bus is bidirectional.

While the present disclosure includes wireless CAN Bus 108 examples, the present teachings apply to both wired and wireless communication connections. As these sensors and systems can, in some implementations, be monitored and communicated with using wireless connections, the need for security and protection from hacking and malicious attacks increases. For example, since some of the example sensors and systems listed above need to transmit a signal wirelessly to function within the vehicle (e.g., the tire pressure monitoring system, the Bluetooth system, the keyless entry system, etc.), there is a risk that these sensors and systems will be intercepted and decoded. Once a hacker gains access to the CAN bus through a communication node, such as a vehicle sensor or system, the hacker may be able to control or provide commands to the various vehicle systems connected to the CAN bus. Thus, there is a need for the control module 104, for example, to verify that messages received through the CAN Bus 108 are authentic and not the result of a malicious attack. While the present disclosure discusses authentication by the control module 104, the authentication could alternatively or additionally be performed by other vehicle modules or systems.

One authentication method is to verify each message or packet that is sent to and from the various sensors and systems within a vehicle. However, the bit space available within each communication packet sent to and from each sensor or system is limited. Therefore, sending an authentication message with each packet could overload the capacity of the processing systems and increase latency. Instead, the present teachings include systems and methods that recognize vehicle operating conditions that could indicate that a malicious attack is occurring. In other words, the systems and methods can determine the conditions when it is most likely that a hacker is attempting to gain access to the sensors and systems of the vehicle and can then implement a requirement for authentication.

For example, one method a hacker could use to gain access to the control module 104, or other sensors or systems within the vehicle, is by bombarding one of the sensors or systems with extreme conditions to gain control of the control module 104. For example, through the tire pressure monitoring system, the hacker could overload the wireless transmission system with communication packets indicating continuous low or high tire pressure readings to gain access to the control module 104. Therefore, one example of conditions where a malicious attack may be occurring is when sensors or systems are operating outside of acceptable ranges.

To detect when a malicious attack may be occurring, an authentication message can be sent in the packet to the sensor or system when the sensor or system is operating outside of its normal operating range. Only sending authentication messages when the sensor or system is operating outside of its normal operating range avoids overloading the capacity of the processing systems and can prevent latency.

For example, a normal operating range for the tire pressure of the vehicle may be 29-40 psi, depending on the type of vehicle. For further example, a normal operating range for a keyless entry system may be around 315 MHz. For further example, Bluetooth and wireless high-speed internet communication systems may operate within a 83 MHz range of the 2.4 GHz band. The operating ranges for the sensors and systems of the vehicle may be predetermined and/or pre-programmed into the control module 104 or another vehicle system or module. The control module 104 may check whether each of the sensors is operating within their respective normal operating ranges. If one of these sensors is not operating within its normal operating range, this may trigger the control module 104 to require authentication of the messages sent to and from the sensor that is operating outside of its normal range. For example, the control module 104 can send an authentication message via the CAN Bus 108 to the particular sensor or system that is operating outside of its normal operating range. In response, the sensor or system can send a response message with an authentication code. The authentication code is included, for example, as part of a packet or message in the form of a particular series of bits. If the correct authentication code is provided by the sensor, then the sensor is verified as authentic, while simply operating out-of-range. In such case, there is no threat of a malicious attack or hacker. However, if a malicious attack is occurring, the necessary authentication code may not be provided, and the control module 104 can perform remedial actions to prohibit communication with the particular sensor or system and prevent the malicious attack or hacker from gaining access to the control module 104 or other vehicles systems or modules.

Figure 2:
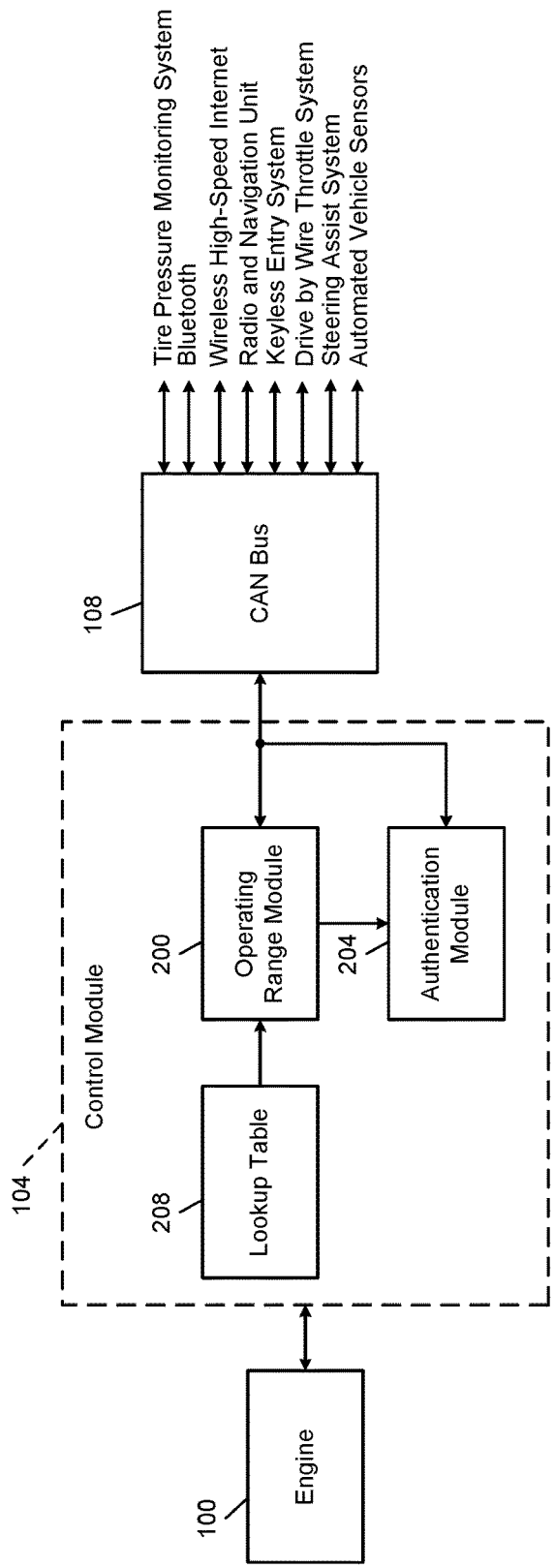
FIG. 2 is a functional block diagram of an implementation of a CAN Bus authentication system.

With reference to FIG. 2, a functional block diagram of an implementation of a CAN Bus 108 authentication system is illustrated. The control module 104 generally includes an operating range module 200, an authentication module 204, and a lookup table 208. The lookup table 208 stores the acceptable operating range values for each of the vehicle sensors and systems. The operating range module 200 monitors all of the sensors and systems in communication with the control module 104. The control module 104 sends and receives packets that may include information and messages to and from the sensors and systems of the vehicle via the CAN Bus 108. For example, the CAN bus 108 communicates sensor and system values to the control module 104 to use as inputs for controlling various vehicle systems. The sensor values are monitored by the operating range module 200, which determines whether each sensor and system is operating within a predetermined acceptable operating range, as stored in the lookup table 208.

Certain sensors may be deemed more critical than others and may require constant or closer monitoring. For example, sensors that are deemed more critical may be those that include a further transmission distance. Sensors that must wirelessly transmit values further than other sensors can be more vulnerable to attack. For example, the tire pressure monitoring system must wirelessly transmit tire pressure values further, and therefore, is more vulnerable to attack. Some other systems that have a longer transmit distance include Bluetooth, wireless high-speed internet, and keyless entry systems.

In one implementation, the more critical sensors or systems may include a stricter operating range, meaning that any deviation from the predetermined operating range requires an authentication message to be sent. In another implementation, each sensor or system may have a tolerance or threshold value for determining whether that sensor or system is operating within an acceptable range. For example, in one implementation the tire pressure monitoring system is determined to be operating outside of an acceptable range when the measured value of the tire pressure is not within the 29-40 psi range. In another implementation, the normal operating range may be the same for the tire pressure monitoring system (29-40 psi), but only when the measured tire pressure falls outside of the acceptable operating range by the threshold value (e.g., 3 psi) will the operating range module 200 signal that the system is operating outside of the acceptable range.

In another implementation, the operating range module 200 may monitor the number of times a particular sensor is operating outside of the normal or expected range. For example, for any sensor, the authentication message may only be sent if the number of occurrences of the sensor operating outside the acceptable range exceeds a threshold count. For further example, the authentication message may only be sent if the number of consecutive occurrences of the sensor operating outside of the acceptable range exceeds a threshold count. In this way, the number of occurrences may be reset if an occurrence of the sensor operating within the acceptable range is received before reaching the threshold count. For example, the threshold may be three packets and, in such case, the authentication message may be sent if three consecutive packets are received with data indicating that the associated system or sensor is operating outside of the acceptable range. Alternatively, if an initial packet is received indicating that the associated system or sensor is operating outside of the acceptable range, and then a second packet is received indicating that the associated system or sensor is operating back within the acceptable range, this may be deemed normal operation and the tracked number of occurrences may be reset. In yet another implementation, the authentication message may only be sent if the number of occurrences exceeds the threshold count within a prescribed period of time.

Whether the authentication message is sent every time the sensor is outside of the acceptable operating range, every time the threshold value is exceeded, or every time the threshold count is exceeded may be predetermined and/or decided during operation by the operating range module 200. Further, the operating range module may reference the lookup table 208 to determine acceptable operating ranges for each sensor and system. The lookup table 208 may further include information regarding the acceptable range, the threshold value, and/or the threshold count.

The authentication module 204 sends the authentication message to the sensors or systems of the vehicle via the CAN Bus 108. The operating range module 200 determines if authentication of a particular sensor is necessary and prompts the authentication module 204 to send the authentication message. If the sensor is simply operating out-of-range absent a malicious attack or hacker, for example, when the tire pressure is low, the tire pressure monitoring system will send an authentication code to the authentication module 204. The authentication module 204 verifies the authentication code by comparing the received code to a predetermined authentication code stored and accessible to the authentication module 204. Under this circumstance, the authentication module 204 may trigger a warning to the control module 104 to indicate that the tire pressure is low. If there has been a malicious attack, the hacker would not be able to provide the authentication code and the authentication module 204 would verify that a threat is present. If the authentication module 204 fails to receive the necessary authentication code, the control module 104 may take remedial actions.

Remedial actions may include triggering a warning that indicates a malicious attack may be occurring. Alternatively, the remedial action may include ending communication with the sensor or system that failed to provide the necessary authentication code and notify a user that communication has ended with the sensor or system due to a potential malicious attack. Alternatively, the remedial action may include advising the driver to pull over in a safe location and shut off or restart the vehicle. The remedial action may also include controlling the vehicle to pull over or stop in a safe location and to shut off and restart the vehicle. The remedial action may also include advising the driver of the nearest service location or dealership.

Figure 3:
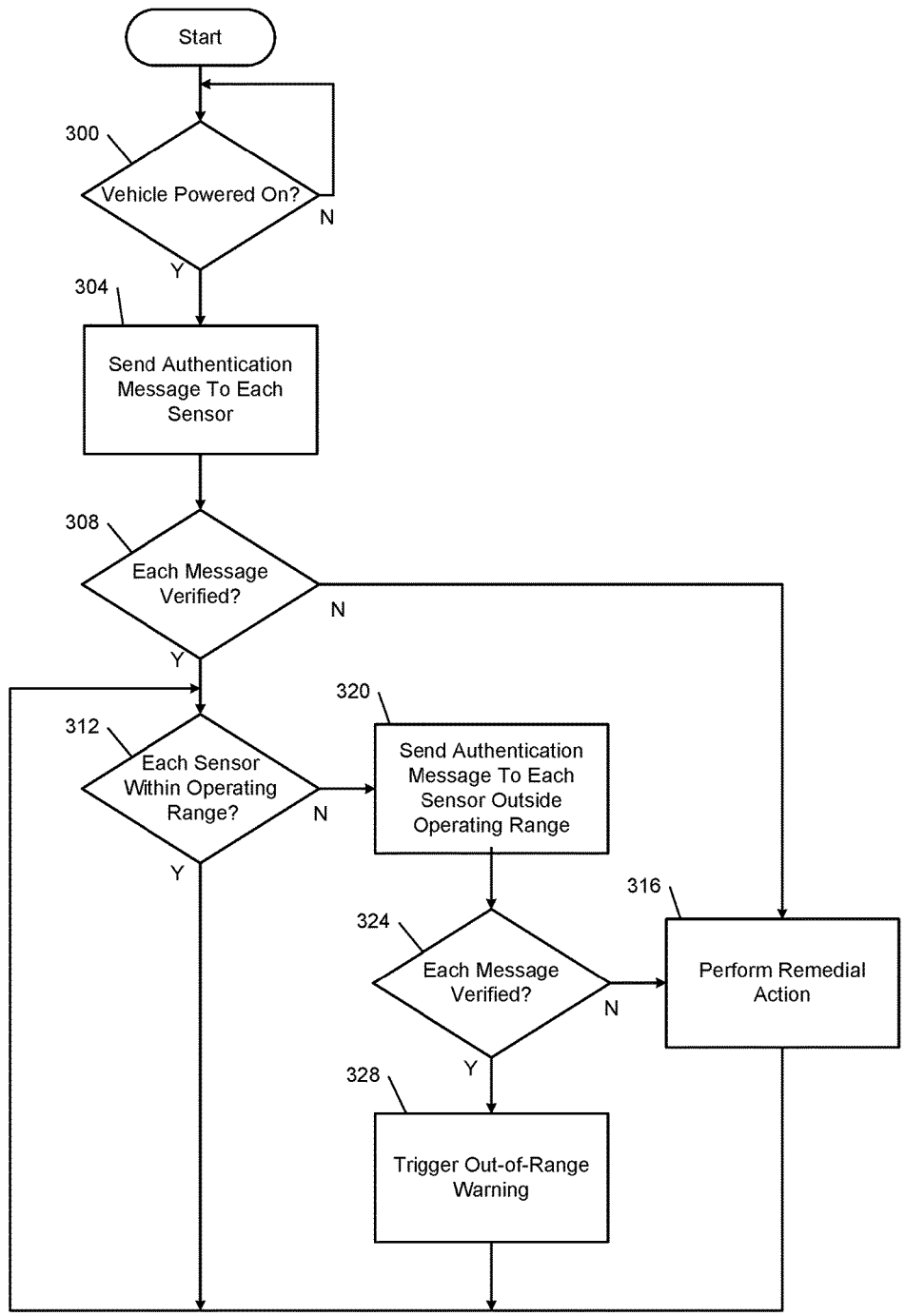
FIG. 3 is a flowchart for an implementation of a CAN Bus authentication system.

With reference to FIG. 3, a flowchart for an implementation of a CAN Bus 108 authentication system is illustrated. This method may be performed by the control module 104, the operating range module 200, and the authentication module 204. At 300, the control module 104 determines whether the vehicle has been powered on. Control waits until the vehicle has been powered on. Once the vehicle has been powered on 300, the authentication module 204 will send authentication messages to each sensor or system of the vehicle 304 to determine if a malicious attack has occurred on vehicle startup. At 308, the authentication module 204 determines whether each message was verified, i.e., if each sensor or system correctly responded to the authentication message with a correct authentication code. If each message was verified, the operating range module 200 proceeds to 312 and monitors each sensor and system. At 308, if a particular message was not verified, the control module 104 proceeds to 316 and performs a remedial action, such as terminating communication with the system or sensor that did not respond to the authentication message with the correct authentication code.

Alternatively, the control module 104 could have a predetermined action when the messages to each sensor could not be verified when the vehicle was powered on. This predetermined action may indicate to the user that the necessary authentication code(s) were not provided when the vehicle was powered on and vehicle maintenance is required.

Returning to 312, the operating range module 200 monitors and determines whether each sensor or system is within its normal operating range. As discussed above, the operating range module 200 may access the lookup table 208 to determine the acceptable operating ranges for each sensor or system. Further, the operating range module could include certain tolerances (e.g. the threshold value) for the acceptable operating ranges and/or maintain a count of occurrences of the sensor operating outside of the acceptable range.

At 320, in response to a sensor operating outside of the acceptable operating range, the authentication module 204 sends an authentication message to each sensor or system operating outside of the prescribed acceptable range. As discussed, the authentication message may be sent each time a sensor is outside of the acceptable operating range, each time the sensor is outside of the acceptable operating range by a predetermined threshold value, and/or each time the count of occurrences of the sensor being outside of the acceptable operating range exceeds a threshold count. Alternatively, if every sensor is operating within the acceptable operating range, the operating range module 200 continues to monitor each sensor at 312, only taking further action when the sensor is outside of the acceptable operating range.

At 324, the authentication module 204 determines whether each authentication message that was sent has been verified. For example, the authentication message may be verified by the sensor or system providing the necessary authentication code. If the authentication message is verified, the authentication module 204 will trigger an out-of-range warning at 328. The out-of-range warning instructs the user of the vehicle that the sensor is operating outside of the acceptable operating range and that there has not been a malicious attack. The out-of-range warning could be the illumination of a light on the vehicle dashboard or any other form of an audible, visual, and/or haptic warning to the driver within the vehicle.

If the authentication message was not verified, the control module 104 performs remedial action at 316. The remedial action may be triggering an indication light on the vehicle dash board, ending communication with the sensor, etc. The remedial action may depend on a classification of the sensor. For example, certain sensors may be classified as more critical or more vulnerable to attack than others. For more critical systems, the control module 104 may perform remedial actions including instructing the CAN Bus 108 to end communication with the sensor and indicate that a malicious attack has occurred. For less critical sensors, other appropriate, less severe remedial actions may be taken, e.g., illumination of an indicator light.

Alternatively, as discussed above, the threshold value or the threshold count may be used for less critical sensors as well. For example, if the tire pressure monitoring system were deemed as less vulnerable to malicious attack, the authentication message may only be sent when the tire pressure value has been outside of the acceptable operating range five consecutive times. Further, the operating range module 200 may require that the sensor measurement be outside of the acceptable operating range at least five times, for example, within a prescribed period of time.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A system comprising:
   a control module configured to:
   receive a communication packet from a communication node that includes at least one of a vehicle sensor and a vehicle system via a controller area network bus;
   determine whether the communication packet from the communication node indicates that the at least one of the vehicle sensor and the vehicle system associated with the communication node is operating outside of a predetermined acceptable operating parameters of the sensor;
   send an authentication message to the communication node in response to the communication packet indicating that the at least one of the vehicle sensor and the vehicle system is operating outside of the predetermined acceptable operating parameters of the sensor;
   determine whether a valid authentication code is received from the communication node in response to the authentication message; and
   perform a remedial action for the communication node in response to the valid authentication code not being received from the communication node.

2. The system of claim 1 wherein the remedial action includes ending communication between the control module and the communication node.

3. The system of claim 1 wherein the remedial action includes generating a notification for a potential attack warning.

4. The system of claim 1 wherein the control module triggers an out of range warning in response to the valid authentication code being received from the communication node and to the communication packet indicating that the at least one of the vehicle sensor and the vehicle system is operating outside of the predetermined acceptable operating parameters of the sensor.

5. The system of claim 1 wherein the control module includes a lookup table of the predetermined acceptable operating parameters of the sensors for each of the at least one of the vehicle sensor and the vehicle system.

6. The system of claim 1 wherein the control module sends an initial authentication message to the communication node in response to a vehicle associated with the communication node being powered on.

7. The system of claim 1 wherein the control module sends the authentication message to the communication node in response to the communication packet indicating that the at least one of the vehicle sensor and the vehicle system is operating outside of the predetermined acceptable operating parameters of the sensor by a threshold value.

8. The system of claim 1 wherein the control module maintains a count of occurrences for the communication node, wherein the count of occurrences is incremented each time the at least one of the vehicle sensor and the vehicle system exceeds the predetermined acceptable operating parameters of the sensor by a threshold value.

9. The system of claim 8 wherein the control module sends the authentication message to the communication node in response to the count of occurrences for the at least one of the vehicle sensor and the vehicle system exceeding a threshold count.

10. The system of claim 8 wherein the control module selectively performs the remedial action in response to the count of occurrences exceeding a threshold count.

11. A method comprising:
    receiving, with a control module, a communication packet from a communication node that includes at least one of a vehicle sensor and a vehicle system via a controller area network bus;
    determining, with the control module, whether the communication packet from the communication node indicates that the at least one of the vehicle sensor and the vehicle system associated with the communication node is operating outside of a predetermined acceptable operating parameters of the sensor;
    sending, with the control module, an authentication message to the communication node via the controller area network bus in response to the communication packet indicating that the at least one of the vehicle sensor and the vehicle system is operating outside of the predetermined acceptable operating parameters of the sensor;
    determining, with the control module, whether a valid authentication code is received from the communication node in response to the authentication message; and
    performing, with the control module, a remedial action for the communication node in response to the valid authentication code not being received from the communication node.

12. The method of claim 11 wherein the remedial action includes ending communication between the control module and the communication node.

13. The method of claim 11 wherein the remedial action includes generating a notification for a potential attack warning.

14. The method of claim 11 further comprising triggering, with the control module, an out of range warning in response to the valid authentication code being received from the communication node and to the communication packet indicating that the at least one of the vehicle sensor and the vehicle system is operating outside of the predetermined acceptable operating parameters of the sensor.

15. The method of claim 11 wherein the control module includes a lookup table of the predetermined acceptable operating parameters of the sensors for each of the at least one of the vehicle sensor and the vehicle system.

16. The method of claim 11 further comprising sending, with the control module, an initial authentication message to the communication node in response to a vehicle associated with the communication node being powered on.

17. The method of claim 11 further comprising sending, with the control module, the authentication message to the communication node in response to the communication packet indicating that the at least one of the vehicle sensor and the vehicle system is operating outside of the predetermined acceptable operating parameters of the sensor by a threshold value.

18. The method of claim 11 further comprising maintaining, with the control module, a count of occurrences for the communication node, wherein the count of occurrences is incremented each time the at least one of the vehicle sensor and the vehicle system exceeds the predetermined acceptable operating parameters of the sensor by a threshold value.

19. The method of claim 18 further comprising sending, with the control module, the authentication message to the communication node in response to the count of occurrences for the at least one of the vehicle sensor and the vehicle system exceeding a threshold count.

20. The method of claim 18 further comprising performing, with the control module, the remedial action in response to the count of occurrences exceeding a threshold count.

* * * * *